United States Patent [19]

Herbst et al.

[11] 4,156,209

[45] May 22, 1979

[54] LENS FREE OF BACK FOCAL POINTS FOR USE WITH HIGH POWER LIGHT BEAMS

[75] Inventors: Richard L. Herbst, Menlo Park; Robert L. Mortensen, Palo Alto, both of Calif.

[73] Assignee: Quanta-Ray, Inc., Mountain View, Calif.

[21] Appl. No.: 797,535

[22] Filed: May 16, 1977

[51] Int. Cl.² ............................................. H01S 3/00
[52] U.S. Cl. ........................... 331/94.5 C; 350/175 R; 350/276 R
[58] Field of Search .................... 350/175 R, 17, 205, 350/276 R, 276 SL; 331/94.5 C, DIG. 1

[56] References Cited
U.S. PATENT DOCUMENTS

| | | | |
|---|---|---|---|
| 3,521,192 | 7/1970 | DeMaria et al. | 331/94.5 C |
| 3,544,198 | 12/1970 | Metz et al. | 350/189 |
| 3,611,184 | 10/1971 | Moore | 331/94.5 C |

*Primary Examiner*—Conrad J. Clark
*Attorney, Agent, or Firm*—Harry E. Aine; Harvey G. Lowhurst

[57] ABSTRACT

A meniscus lens is disclosed for use in high power light beam applications, such as in the optics of a high power laser where the laser beam intensity is in excess of one megawatt per square centimeter. The meniscus lens is designed such that light rays reflected from the lens are divergent so that no back focal points are created by the lens. In this manner, undesired dielectric breakdowns and damage to optical components and the like are avoided due to reflected back focal points. In one embodiment of the present invention, the output mirror of a high power laser is deposited upon the convex face of a meniscus lens, such lens being designed to avoid back focal points, whereby the construction of the output mirror is greatly simplified.

7 Claims, 5 Drawing Figures

POSITIVE LENS
$r_1 < 0, \; r_2 < 0$
$|r_2| > |r_1|$

NEGATIVE LENS
$r_1 < 0, \; r_2 < 0$
$|r_1| > |r_2|$

LENS FREE OF BACK FOCAL POINTS FOR USE WITH HIGH POWER LIGHT BEAMS

BACKGROUND OF THE INVENTION

The present invention relates in general to meniscus lenses for use in high power light beam applications and, more particularly, to such lenses which are free of back focal points and which may be utilized as a support for the output mirror of high power unstable resonators, as employed in a high power laser.

DESCRIPTION OF THE PRIOR ART

Heretofore, various types of lenses have been employed along the optical beam paths of high power light beam systems such as those employed with high power lasers wherein the power density of the laser beam is in excess of one megawatt per square centimeter. However, such lenses have typically been tilted relative to the optical axis so that beam energy reflected from the lens will not have a back focal point within the optical system so that critical components of the optical system are not deleteriously affected by the high intensity of the reflected beam at the back focal point.

One problem with tilting of the lenses within the optical system is that there is an undesired distortion introduced into the forward projected beam. Thus, it is desired to provide an improved lens for use in high power optical beam systems which does not have the back focal points and which does not have to be tilted relative to the optical axis to avoid such back focal points.

SUMMARY OF THE PRESENT INVENTION

The principal object of the present invention is the provision of an improved meniscus lens which is free of back focal points for use within a high power light beam system.

In one feature of the present invention, a meniscus lens is provided and the radii of curvature of the two faces of the lens are related such that the light rays reflected from the meniscus lens will be divergent so that the lens does not create back focal points within the optical system.

In another feature of the present invention, the meniscus lens satisfies the relation, $$nr_1 \leq (N-1)r_2$$

where $r_1$ and $r_2$ are the radii of curvature of the first and second faces of the meniscus lens and both faces of the lens are negative (a lens face is negative when its surface is convex toward the incident light beam, otherwise the lens face is positive) and n is the index of refraction of the lens material.

In another feature of the present invention, one mirror of an unstable optical resonator is deposited upon the convex face of a meniscus lens, such lens satisfying the requirement that the radii of curvature of both faces are related such that the light rays reflected from the meniscus lens are divergent so that the lens does not produce back focal points within the optical system.

Other features and advantages of the present invention will become apparent upon a perusal of the following specification taken in connection with the accompanying drawings wherein:

DESCRIPTION OF THE PREFERRED EMBODIMENTS

Figure 1:
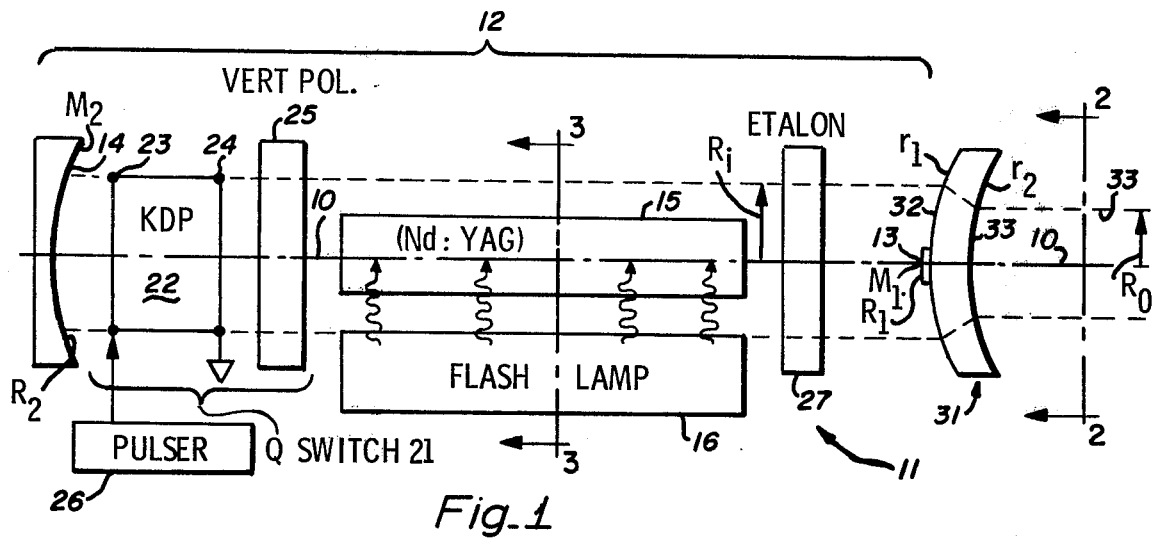
FIG. 1 is a schematic line diagram, partly in block diagram form, of a laser incorporating features of the present invention.

Referring now to FIG. 1 there is shown a laser 11 incorporating features of the present invention. The laser includes an optical resonator 12 defined by the region between an output mirror 13 and another end mirror 14. The spacing L between the first and second mirrors 13 and 14 must be adjusted to take into account the optical characteristics of all of the optical elements disposed within the optical resonator 12.

Figure 3:
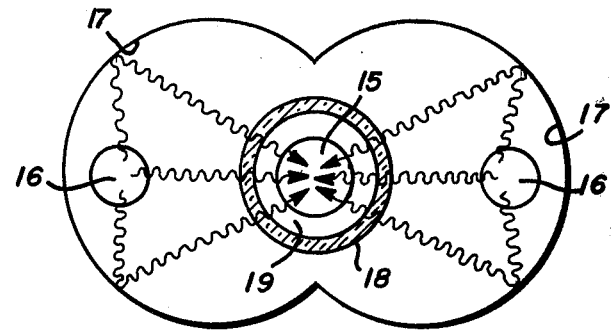
FIG. 3 is a transverse sectional view of the structure of FIG. 1 taken along line 3—3 in the direction of the arrows.

A laser high gain medium 15, such as a neodymium doped yttrium-aluminum garnet (Nd:YAG) is disposed on the optical axis 10 of the resonator 12 for providing optical gain for the laser. A flash lamp 16, (FIG. 3) such as a pair of xenon flash lamps, disposed within a pair of elliptical reflectors 17, serves to irradiate the laser gain medium with optical energy for pumping the laser gain medium 15 to a population inversion of the lasing transitions. A hollow cylindrical ultraviolet filter 18 is disposed coaxially surrounding the laser gain medium 15 in spaced relation therefrom to filter out the UV radiation and to provide an annular passageway 19 for flow of a fluid coolant therethrough for cooling of the laser gain medium in use.

A Q switch 21 (FIG. 1) is disposed within the optical resonator 12 on the optical axis thereof. The Q switch serves as a fast acting switch for pulsing the laser on and off. In a preferred embodiment the Q switch 21 comprises a KD*P crystal 22 having a pair of ring electrodes 23 and 24 disposed on opposite ends thereof for applying an electrical potential thereacross so that when the potential, as of several kV, is applied across the KD*P crystal 22 the crystal serves to rotate the polarization of the optical radiation by approximately one-quarter of the wavelength for each transit through the KD*P crystals. A linear polarizer 25 is associated with the KD*P crystal for polarizing the optical radiation in a first linear direction, such as in the vertical direction. The electrical potential is applied across the KD*P crystal from a pulser 26, such as a thyratron. A tilted etalon 27 is disposed on the optical axis of the resonator for providing a band pass filter at the desired operating optical wavelength of the resonator. The output mirror 13 is supported from the convex inner face of a meniscus lens 31.

The optical resonator 12 is designed as an unstable resonator, i.e., a ray slightly off the optical axis of the resonator 12 traces a reflective path back and forth between the mirrors 13 and 14 which begins near the axis 10 of the resonator and moves to the outside of the resonator, thereby producing a power flow in the resonator which moves radially outward from the optical axis 10 of the resonator. In this manner, the optical energy is coupled by diffraction out of the resonator 12 around the outer periphery of the output mirror 13.

In addition, the curvatures of the two mirrors and the focal properties of the various elements within the resonator, especially including the thermal focusing properties of the laser gain medium 15 are arranged so that the output beam at the plane of the output mirror 13 is collimated, e.g., the beam is neither diverging nor converging in the region of the beam at the output mirror 13. This is accomplished in the preferred embodiment of the present invention, as illustrated in FIG. 1, by designing the optical resonator 12 taking into account the thermal focusing properties of the laser gain medium 15 so that the optical resonator is a confocal resonator, i.e., the focii of the two mirrors, including the positive focusing effect of the laser gain medium 15 occur at the same point outside of the optical resonator 12. In case the output mirror 13 is convex, the focal point thereof, as used in the definition of confocal, refers to the imaginary focal point and corresponds essentially to the radius of curvature $R_1$ of the output mirror 13 divided by two. The focal region of the optical resonator 12 occurs in the transverse plane of the output mirror 13.

As above mentioned, the laser gain medium 15, such as the Nd:YAG laser rod, has a thermal focusing effect and operates as a positive lens having a focal length f in meters versus average flash lamp input power P in kilowatts which is closely approximated by the equation:

$$f = 2.1/P \qquad \text{(Eq. 1)}$$

In addition the optical resonator 12 is designed so that no focal point is included within the resonator 12 (positive branch resonator). The reason for this is that at a focal point within the resonator, the intensity of the beam might well exceed the dielectric strength of the air or of the material in which the focal point occurred. This would result in deleteriously affecting the peak power capability of the laser and could result in destruction or degradation of one or more of the optical components within the optical resonator 12 of the laser.

Furthermore, in a preferred embodiment, the optical resonator 12 is of the confocal type when taking into account the positive lens effect of the laser gain medium 15 due to the thermal gradient produced within the laser gain medium by the absorbed flash lamp power. The optical resonator 12 preferably has an output coupling coefficient or factor $\delta$ which is relatively high, i.e., greater than 50% and preferably in the range of 80 to 90%.

In a typical example of the laser 11, the laser gain medium 15 comprises a lightly doped Nd:YAG rod as of 6.3 millimeter diameter and doped to a doping of between 0.5% and 0.8% Nd by atomic weight. The rod 15 has a length greater than two inches and approximately two inches of its length is pumped by means of the high energy xenon flash lamps 16 having an average input power of approximately 800 watts. The ends of the laser rod 15 are inclined at an angle of approximately 1° out of perpendicular relative to the optical axis of the resonator 12 and are parallel to prevent setting up of undesired multiple reflection internally of the rod. The xenon flash lamps 16 have elliptical reflectors 17 coated with gold or silver. The linear polarizer 25 comprises a calcite crystal which is commercially available from Karl Lambrecht, Inc. of New Jersey. The KD*P crystal 22 has a diameter greater than the diameter D of the laser rod 15 and preferably comprises a deuterated potassium dihydrogen phosphate crystal commercially available from Lasermetrics Inc. of New Jersey. The back resonator reflector 14 can be a grating or a mirror which is planar, concave or convex with a radius of curvature $R_2$ determined by the conditions necessary for a confocal resonator taking into account the positive lens effect of the laser gain medium 15. In one preferred embodiment, the back resonator mirror 14 is concave having a high reflectivity coating formed by multilayer dielectric coating on a fused silica substrate to provide greater than 99% reflectivity at a wavelength of interest for the operating wavelength of the resonator 12. Suitable mirrors are commercially available from Coherent Radiation, Inc. of Palo Alto, California. The diameter of the back resonator mirror 14 is preferably much greater than the diameter D of the laser rod 15 and, in a typical example, is approximately 1.0 inch in diameter.

The line narrowing element, such as the tilted etalon 27, is designed for a narrow passband width between 0.1 and 0.5 wave numbers. In a preferred embodiment it has a band pass center wavelength at 1.064 micrometers. A suitable tilted etalon is commercially available from Coherent Radiation, Inc. of Palo Alto, California. The laser 11 preferably has a resonator magnification M falling within the range of 2 to 5 where the magnification M is defined as the ratio of the diameter D the laser rod 15 to the diameter d of the output mirror 13. In a preferred embodiment, the magnification M was 3.55.

The design of the unstable resonator 12 is complicated by interdependence of the resonator length L, output coupling coefficient $\delta$, laser rod diameter D, and mirror radii of curvature $R_1$ and $R_2$. Since the cavity length and the output coupling coefficient are conveniently varied, the Nd:YAG rod diameter D and mirror radii of curvature $R_1$ and $R_2$ are preferably fixed at standard values.

The mirror radii of curvature for the positive branch confocal optical resonator 12 are defined by:

$$R_1 = 2L/(M-1) \qquad \text{(Eq. 2)}$$

and $$R_2 = 2ML/(M-1) \qquad \text{(Eq. 3)}$$

where L is the empty resonator length, $R_1$ and $R_2$ are the output and back resonator mirror curvatures and M is the magnification. The geometrical output coupling coefficient is defined by:

$$\delta = 1 - \frac{1}{M^2} \qquad \text{(Eq. 4)}$$

In practice, diffraction effects reduce the output coupling coefficient $\delta$ to that value slightly less than that which would be obtained if the optical resonator 12 were designed to operate at equivalent Fresnel numbers, as defined by:

$$N_{eq} = \left(\frac{M-1}{2M^2}\right) \frac{D^2}{4L\lambda} \qquad \text{(Eq. 5)}$$

with values of 0.5, 1.5, 2.5 . . .

In designing the optical resonator 12, it is preferred to eliminate M from Equation (5) using the relation $M=1+2L/|R_1|$ and to solve for the cavity length given by:

$$L = \frac{-|R_1|}{2} + \frac{D}{4}\left[\frac{|R_1|}{\lambda \text{ Neg}}\right]^{\frac{1}{2}} \quad \text{(Eq. 6)}$$

where D is the laser rod diameter and $\lambda$ is the laser wavelength.

The geometrical value for $R_2$ is given by the above relation for a given value of M and L. As a final step, the correction for the focal length of the Nd:YAG rod is introduced. Given the available back mirror curvature $R_2'$ and calculating the laser gain medium rod focal length f required to achieve an effective mirror curvature equal to $R_2$, the following expression may be employed:

$$\frac{1}{f} = \frac{1}{R_2} - \frac{1}{R_2'} \quad \text{(Eq. 7)}$$

Equation (7) applies if the mirror to rod distance l is less than the rod focal length f. The available back mirror curvature $R_2'$ is chosen such that the laser rod focal length f corresponds to the desired average input lamp power, such as 800 watts.

As an example, with $R_1 = -50$ centimeters (convex) radius and Neq$=1.5$ we find that L$=64$ centimeters and $R_2 = +178$ centimeters (concave) at $M=3.53$. The geometrical output coupling coefficient $\delta$ is 92%, however the measured output coupling including diffraction efffects is 84%. For the 6.3 millimeter rod diameter D, the magnification M dictates a 1.8 millimeter diameter d output mirror 13. Operating at an average input lamp power of 500 watts (50 Joules at 10 pulses per second) gives a rod focal length f near 437 centimeters which leads to a standard 300 centimeter (concave) back mirror curvature $R_2$. The output mirror 13 was coated for high reflectivity at 1.06 micrometers and deposited to a 1.80 millimeter diameter d.

Figure 2:
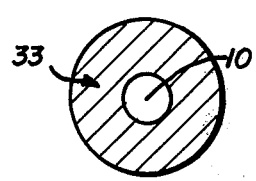
FIG. 2 is a sectional view of the output beam of the laser of FIG. 1 taken along line 2—2 in the direction of the arrows.

The output beam pattern is as shown in FIG. 2 and comprises a 6.3 millimeter diameter spot with a 1.8 millimeter diameter hole. In the near field the Fresnel diffraction rings from the rod 29 and output mirror 13 apertures were evident. In the far field, the beam converted to a modified Airy disc pattern with the fraction of energy in the central lobe equal to the fractional output coupling.

The flash lamp 16 is typically operated with a pulse length of approximately 200 microseconds to deliver between 20 and 70 Joules of energy to the laser rod 15 with a pulse repetition rate of approximately 10 Hertz. The laser is Q-switched on after each of the flash lamp pump pulses to dump the energy stored in the laser gain medium into the output laser beam. The aforementioned laser has operated at up to 250 mJ energy per output beam pulse with a pulse width of approximately 10 nanoseconds. This corresponds to a peak power outside the optical resonator 12 of 25 megawatts and to 75 megawatts per square centimeter. The circulating power density inside the resonator is approximately 100 megawatts per square centimeter. This is to be contrasted with a stable resonator design wherein the output beam pulses have the energy of 10 mJ with a peak power of one megawatt and corresponding to 100 megawatts per square centimeter within the optical resonator. It is seen that the output power is substantially increased at the same circulating power density utilizing an unstable resonator design as contrasted with a stable resonator design. The laser employing the unstable resonator is disclosed and claimed in copending U.S. application Ser. No. 752,110, filed Dec. 20, 1976.

The meniscus lens 31 comprises, for example, a lens made of fused silica or boron silica glass coated on both faces 32 and 33 with an antireflective coating as of silicon dioxide or magnesium fluoride built up in one, two or three layers. The mirror 13 is preferably formed of 12 to 25 layers of zinc sulfide and thorium fluoride. The meniscus lens 31 can be either a positive or a negative lens and in the particular example the lens is shown as a negative lens for adjusting the outer diameter of the output light beam 33 from a radius $R_i$ within the resonator 12 to a radius $R_0$ which is smaller outside of the resonator 12. The output light beam 33 remains collimated in that the light rays remain essentially parallel to the optical axis 10. In a typical example, the radius of the first face $r_1$ of the meniscus lens 31 is $-0.5$ meters, whereas the radius of the second face $r_2$ is equal to $-0.49$ meters.

Due to the high power densities involved in the high power light beam 33, the meniscus lens 31 is designed so that there are no back focal points, i.e., there are no focal points within the optical system including the resonator 12 for portions of the light beam reflected from the meniscus lens 31. If there were back focal points within the optical system, the reflected light beam could produce power densities inside the resonator which might exceed the dielectric strength of one or more of the components therein, thereby either breaking down the air or causing degradation of one or more of the optical components of the system.

For the purposes of the meniscus lens 31 of the present invention, a high power light beam is considered to be a light beam having a power density in excess of 1 megawatt per square centimeter at said lens. It is in systems of this type wherein back focal points for light reflected from the meniscus lens 31 or other lenses within the system might produce deleterious affects.

Figure 4:
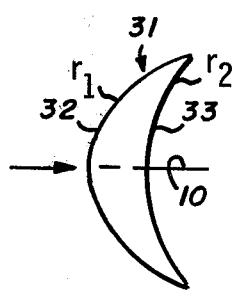
FIG. 4 is a schematic line diagram of a positive meniscus lens.
Figure 5:
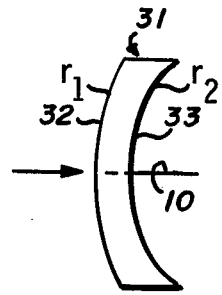
FIG. 5 is a schematic line diagram of a negative meniscus lens.

Back focal points within the optical system are not created by the meniscus lens 31 if the meniscus lens satisfies the relation:

$$nr_1 \leq (n-1)r_2 \quad \text{(Eq. 8)}$$

where $r_1$ and $r_2$ are the radii of curvature of the surface at their axial points, i.e., at the optical axis 10, measured negaitve when the surface is convex toward the incident light beam. The relationship between $r_2$ and $r_1$ for a positive lens ($|r_2| > |r_1|$) is shown in FIG. 4, whereas the relationships for $r_1$ and $r_2$ for a negative lens ($|r_1| > |r_2|$) are shown in FIG. 5. In both instances for a meniscus lens of this invention, $r_1$ and $r_2$ are less than zero, i.e., negative. The relation of Equation (8) holds for a collimated incident beam; that is a beam where the incident rays of the light beam are parallel to the optical axis 10. In case the incident light beam is either converging or diverging, the radii $r_1$ and $r_2$ are chosen such that the light rays reflected from the lens 31 are divergent.

The advantage of the meniscus lens 31 of the present invention is that by combining the positive and negative meniscus lenses 31 the beam can be expanded or contracted as desired without producing back focal points within the optical system. Also the meniscus lenses 31 do not distort the transmitted beam, such distortion had heretofore been encountered in optical systems wherein optical elements were tilted relative to the optical axis to prevent back focal points. By combining the output mirror and a meniscus lens 31, support for the output mirror 13 is readily obtained thereby simplifying the construction of the prior art mirror support in which the output mirror 13 was supported from a post carried from a Brewster angle window. Such a prior art system is relatively fragile and the meniscus lens support of the present invention is more rugged of design and of much simplified construction.

As used herein, lens is defined to include both positive as well as negative power lenses, and to include as well zero power lenses.

In one embodiment of the present invention, the combined output coupling mirror support and meniscus lens 31 is designed so that the center of curvature for face 32 is offset from the optical axis 10. This produces a slight wedge in the thickness of the lens 31 and results in a slight tilt, as of 10 minutes of arc, of the reflected divergent rays to avoid multiple transit interaction between the light rays reflected from the lens 31 and the layer gain medium 15. This also avoids an etalon effect between the surfaces 32 and 33 of the lens 31. This wedge feature of the lens 31 is also applicable to meniscus lenses of the present invention disposed anywhere in the optical system.

This wedge effect is produced when the center of curvature of one face is offset from a line interconnecting the geometric center of the other face and the center of curvature of the other face of the lens.

What is claimed is:

1. In an optical lens system for use with a high power light beam;
    a meniscus lens disposed in an optical path of a high intensity beam of light of an intensity greater than one megawatt per square centimeter at said lens;
    said meniscus lens having radii of curvature for both faces related such that the light rays reflected from said meniscus lens are divergent so that back focal points within the optical system are prevented in use.

2. The apparatus of claim 1 wherein said meniscus lens satisfies the relation, $$nr_1 \leq (n-1)r_2$$

where $r_1$ and $r_2$ are the radii of curvature of the first and second faces of said meniscus lens at the optical axis of the lens, both faces of said lens have negative radii of curvature, a lens face has a negative radius of curvature when its surface is convex toward the incident light beam, otherwise the lens face radius is positive, and n is the index of refraction of the lens material.

3. In a laser system:
    optical resonator means for reflection of light back and forth therebetween;
    laser gain medium means disposed within said optical resonator means for interaction with the resonated light within said optical resonator means for stimulated emission of radiation and for producing a beam of optical radiation of an intensity greater than one megawatt per square centimeter; and
    meniscus lens means disposed in said beam of optical radiation at a point of beam intensity greater than one megawatt per square centimeter and having radii of curvature for both faces thereof related such that the light rays reflected from said meniscus lens are divergent so that said meniscus lens does not produce back focal points within the optical system.

4. The apparatus of claim 3 wherein said meniscus lens satisfies the relation, $$nr_1 \leq (n-1)r_2$$

where $r_1$ and $r_2$ are the radii of curvature of the first and second faces of said meniscus lens respectively at the optical axis of the lens and both faces have negative radii of curvature, a lens face is negative when its surface is convex toward the incident light, otherwise the lens face is positive, and n is the index of refraction of the lens material.

5. The apparatus of claim 3 wherein said optical resonator means includes first and second axially spaced mirrors, one of said mirrors having a convex face facing inwardly of said resonator means and said mirror being disposed on a convex face of said meniscus lens means.

6. The apparatus of claim 1 wherein said meniscus lens is formed and arranged such that the center of curvature of one face of said lens is offset from a line interconnecting the geometric center of the other face and the center of curvature of the other face of said lens.

7. The apparatus of claim 3 wherein said lens is formed and arranged such that the center of curvature of one face of said lens is offset from a line interconnecting the geometric center of the other face and the center of curvature of the other face of said lens.

* * * * *